US007088597B2

(12) United States Patent
Cho

(10) Patent No.: US 7,088,597 B2
(45) Date of Patent: Aug. 8, 2006

(54) HIGH VOLTAGE SUPPLY DEVICE FOR ELIMINATING A SURGE VOLTAGE

(75) Inventor: Jong-hwa Cho, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 10/648,328

(22) Filed: Aug. 27, 2003

(65) Prior Publication Data

US 2004/0051386 A1 Mar. 18, 2004

(30) Foreign Application Priority Data

Aug. 29, 2002 (KR) .............................. 2002-51607

(51) Int. Cl.
*H02M 3/335* (2006.01)

(52) U.S. Cl. ............... 363/21.01; 363/21.1; 363/21.18; 363/61

(58) Field of Classification Search .................. 363/20, 363/21.01, 21.04, 21.1, 21.12, 21.18, 61, 363/97
See application file for complete search history.

(56) References Cited

U.S. PATENT DOCUMENTS

| | | | | |
|---|---|---|---|---|
| 4,380,044 | A | 4/1983 | Parr | 363/21 |
| 4,616,300 | A * | 10/1986 | Santelmann, Jr. | 363/21.02 |
| 4,829,259 | A | 5/1989 | Konopka | 320/21 |
| 4,868,729 | A | 9/1989 | Suzuki | 363/21 |
| 4,888,821 | A * | 12/1989 | Hamp et al. | 363/21.02 |
| 4,975,820 | A | 12/1990 | Szepesi | 363/21 |
| 5,278,746 | A | 1/1994 | Matsumoto | 363/21 |
| 5,336,985 | A | 8/1994 | McKenzie | 323/266 |
| 5,438,499 | A | 8/1995 | Bonte et al. | 363/21 |
| 5,486,992 | A | 1/1996 | Koscica et al. | 363/21 |
| 5,528,125 | A | 6/1996 | Marshall et al. | 323/222 |
| 5,568,343 | A * | 10/1996 | Kosugi | 361/36 |
| 5,600,234 | A | 2/1997 | Hastings et al. | 323/282 |
| 5,619,403 | A | 4/1997 | Ishikawa et al. | 363/21 |
| 5,754,414 | A | 5/1998 | Hanington | 363/21 |
| 5,783,930 | A | 7/1998 | Albert | 320/140 |
| 5,808,455 | A | 9/1998 | Schwartz | 323/271 |
| 5,815,015 | A | 9/1998 | Nelson et al. | 327/141 |
| 5,877,614 | A | 3/1999 | Huber | 323/282 |
| 5,883,501 | A | 3/1999 | Arakawa | 323/222 |

(Continued)

FOREIGN PATENT DOCUMENTS

| | | |
|---|---|---|
| EP | 0 415 244 | 3/1991 |

(Continued)

*Primary Examiner*—Jeffrey Sterrett
(74) *Attorney, Agent, or Firm*—Staas & Halsey LLP

(57) ABSTRACT

A high voltage supply device including a power supply rectifying an externally inputted ac voltage and generating a first dc voltage and a second dc voltage, a controller generating a pulse signal having a predetermined duty ratio and a control signal having a first logic level when the first dc voltage is applied, a high voltage generator boosting the second dc voltage based on the pulse signal, and a power supply controller driven when the control signal is in the first logic level, and cutting off an application of the second dc voltage to the high voltage generator when the control signal is in a second logic level. Such a high voltage supply device, when used in electronic devices such as laser printers, facsimile machines and DC—DC converters requiring a high dc voltage, does not generate a surge voltage when the electronic devices are turned off.

11 Claims, 5 Drawing Sheets

U.S. PATENT DOCUMENTS

| | | | | |
|---|---|---|---|---|
| 5,926,383 | A | 7/1999 | Pilukaitis et al. | 363/50 |
| 6,055,168 | A | 4/2000 | Kotowski et al. | 363/60 |
| 6,147,883 | A * | 11/2000 | Balakrishnan et al. | 363/49 |
| 6,188,588 | B1 | 2/2001 | Hemena et al. | 363/21 |
| 6,304,462 | B1 * | 10/2001 | Balakrishnan et al. | 363/21.01 |
| 6,362,981 | B1 | 3/2002 | Balakrishnan et al. | 363/55 |
| 6,366,068 | B1 | 4/2002 | Morishita | 323/282 |
| 6,366,481 | B1 | 4/2002 | Balakrishnan et al. | 363/21.15 |
| 6,760,238 | B1 * | 7/2004 | Charych | 363/97 |

FOREIGN PATENT DOCUMENTS

| | | |
|---|---|---|
| EP | 649 222 | 4/1995 |
| EP | 1 209 549 | 5/2002 |
| FR | 2 610 149 | 7/1988 |
| GB | 1 596 674 | 8/1981 |
| GB | 2 320 342 | 6/1998 |
| JP | 54-044720 | 4/1979 |
| JP | 54-090523 | 7/1979 |
| WO | 98/38727 | 9/1998 |

* cited by examiner

VOUT
300
340
341
342
343
344
345
346
347
348
349
VP
b
c
332
332a
332b
330
331
320
323
310
311
312
18V
PWM
400
410
411
412
413
414
420
42
422
d
e
f
Pow_en
24V
5V
AC
POWER SUPPLY
100
CONTROLLER
200

HIGH VOLTAGE SUPPLY DEVICE FOR ELIMINATING A SURGE VOLTAGE

CROSS-REFERENCE TO RELATED APPLICATION

This application claims the benefit of Korean Patent Application No. 2002-51607, filed on Aug. 29, 2002, in the Korean Intellectual Property Office, the disclosure of which is incorporated herein by reference.

BACKGROUND OF THE INVENTION

1. Field of the Invention

The present invention relates to a high voltage supply device, and more particularly, to a high voltage supply device for substantially eliminating a surge voltage occurring upon turning off electric power.

2. Description of the Related Art

A high voltage supply device is commonly used for electronic devices, such as laser printers and facsimile machines, requiring a high dc voltage source. Such a high voltage supply device may convert a dc voltage into a high ac voltage, and regulate and convert the ac voltage into a high dc voltage. The high voltage supply generally has a transformer for converting a dc voltage into an ac voltage.

The high voltage supply device may generate an undesired surge voltage while converting dc voltages into ac voltages when using a transformer. An electronic device having such a high voltage supply device may induce a high surge voltage when power is turned off, by discharging a dc voltage applied to the transformer, and such a surge voltage may partially or totally damage the electronic device. In the case of a laser printer, a surge voltage, occurring at the time electric power applied to the printer is cutoff, may induce another surge voltage to be applied to an organic photo conductor drum, which may damage the drum. In addition, electric power applied to the high voltage supply device while in the stand-by mode is unnecessarily consumed.

FIG. 1 is a block diagram schematically showing a conventional high voltage supply device. The high voltage supply device shown in FIG. 1 has a power supply 10, a controller 20, and a high voltage generator 30. The power supply 10 rectifies an ac voltage externally applied, and generates dc voltages of, for example, 24V and 5V. The voltage of 24V may be used as an operation voltage for the high voltage generator 30, and the voltage of 5V may be used as an operation voltage of the controller 20.

The controller 20 outputs a pulse width modulation (PWM) signal having a predetermined duty ratio according to a preset value.

The high voltage generator 30 generates ac voltages ranging from a few hundred volts to a few thousand volts by on and off switching operations by a PWM signal applied from the controller 20.

The high voltage generator 30 includes a switching part 31, a transformer 32, and a rectifier 33.

The switching part 31 is repeatedly turned on and off by a PWM signal applied from the controller 20. For example, when the switching part 31 is turned off by a PWM signal from the controller 20, the voltage 24V cuts off a current path on an input side 32*a* of the transformer 32.

The transformer 32 induces a high ac voltage across output terminals 32*b* from the ac voltage of 24V turned on and off by the switching part 31. The number of wire windings of the output terminals 32*b* may be greater than the number of wire windings of the input terminals 32*a* in order to output a voltage higher than an applied voltage.

The rectifier 33 rectifies, and converts to a dc voltage, an ac voltage outputted from the output terminals 32*b* of the transformer 32. The rectifier 33 uses a N-times multiple voltage rectification method to heighten a voltage outputted from the transformer 32.

At substantially the same time, the controller 20 sets the switching part 31 to be enabled in order to enhance the stability of signal inputs and outputs when an outputted PWM signal is a logic "low," generally referred to as an active low; one of methods frequently used in digital logic. Accordingly, when the dc voltage of 5V applied to the controller 20 is cutoff, a PWM signal outputted from the controller 20 becomes the logic "low" and, at this time, the switching part 31 may malfunction. Further, since the operation voltage of 5V of the controller 20 is very low compared to the operation voltage of 24V of the high voltage generator 30, the voltage source of 24V has a potential level higher than the voltage source of 5V at the time the voltage source of 5V becomes a ground level when the high voltage supply device is turned off. For example, even when the operation voltage of the controller 20 of 5V is lowered to a value equal to, or less than, 2.5V, the dc voltage of 24V has a potential level of about 18V. Accordingly, when a PWM signal outputted from the controller 20 is a logic "low," the switching part 31 is turned on so that the input terminals 32*a* of the transformer 32 form a current path between the voltage potential of 18V and the ground terminal. In this case, a high ac voltage is induced across the output terminals 32*b* of the transformer 32, and rectified and outputted by the rectifier 33.

FIG. 2 is a view showing an output voltage waveform of a high voltage supply device when the high voltage supply device of FIG. 1 is turned off.

As shown in FIG. 2, a dc voltage e.g., 18V exists across the input terminals 32*a* of the transformer 32 and the ground terminal at the time labeled 1, when an ac voltage applied external to the power supply 10 is cut off, so that the voltage of 5V is lowered to a value equal to, or less, than 2.5V. At this time, since the voltage of 5V outputted from the power supply 10 drops to a value substantially equal to, or less than, 2.5V, the power supply 10 does not drive the controller 20 which operates at 5V, and a PWM signal outputted from the controller 20 becomes the logic "low." However, when the controller 20 is turned off at point 1, the dc voltage of 18V outputted from the power supply 10 has been applied to the input terminal of the transformer 32. Accordingly, when the potential level of the PWM signal outputted from the controller 20 becomes the logic "low," a voltage, labeled "a", exists between the input terminal 32*a* of the transformer 32 and the ground so that a high ac voltage e.g., surge voltage is induced across the output terminals 32*b* of the transformer 32.

As described above, a high dc voltage, applied to electronic devices such as laser printers, facsimile machines, or the like, may damage parts of electronic devices when the devices are in a power-off state.

SUMMARY OF THE INVENTION

Accordingly, it is an aspect of the present invention to provide a high voltage supply device and method for reducing surge voltage generations.

According to an aspect of the present invention, a high voltage supply device includes a power supply rectifying an externally inputted ac voltage and generating dc voltages, a controller generating a pulse signal having a predetermined duty ratio and a control signal having a first logic level when a first dc voltage is applied, a high voltage generator boosting a second dc voltage based on the pulse signal, and a power supply controller driven when the control signal is in a first logic level, and for cutting off an application of the second dc voltage to the high voltage generator when the control signal is in a second logic level.

According to another aspect of the present invention, the high voltage generator may include an amplifier amplifying the pulse signal from the controller, wherein the control signal is a pulse width modulation(PWM) signal, a comparator comparing the PWM signal outputted from the amplifier and a boosted voltage, a voltage booster boosting the second dc voltage based on switching operations according to an output of the comparator, and a rectifier rectifying an output of the voltage booster.

The amplifier includes a transistor, the emitter of which is connected to a dc voltage having a potential level between potential levels of a first dc voltage and a second dc voltage, and the base of which is applied with the control signal, and a resistor connected between the collector of the transistor and the ground potential.

The comparator inputs an output of the amplifier through a positive input terminal thereof and input a fed-back boosted voltage through a negative input terminal thereof.

The voltage booster includes a transistor, the emitter of which is grounded and the base of which is connected to an output of the comparator, and a transformer the input terminals of which are connected to a dc voltage applied through the power supply controller and the collector of the transistor respectively.

The rectifier may be a N-times multiple voltage rectifier for boosting a potential level of a voltage outputted from the voltage booster.

The power supply controller includes a transistor, the emitter of which inputs the second dc voltage and the collector of which outputs the second dc voltage, a resistor connected between the emitter of the transistor and the base of the transistor, a second resistor to one end of which is applied the control signal, a second transistor a base of which may be connected to the other end of the second resistor and an emitter which is grounded, a third resistor connected to the base and emitter of the second transistor, and a fourth resistor connected between the collector and base of the second transistor.

The power supply controller may be an NMOS transistor, a drain and a gate of which are inputted with the dc voltage, and a source of which becomes an output terminal.

According to another aspect of the present invention, a high voltage control method includes operations of rectifying an externally inputted ac voltage and generating dc voltages, generating a pulse signal having a preset duty ratio and a control signal having a first logic level based on a first dc voltage, boosting a second dc voltage based on the pulse signal, and cutting off the voltage boosting when the control signal is a second logic level.

According to another aspect of the present invention, voltage boosting includes amplifying the pulse signal, comparing the amplified pulse signal and the boosted voltage, boosting the second dc voltage based on a result of the comparison, and rectifying the boosted voltage.

Additional aspects and advantages of the invention will be set forth in part in the description which follows and, in part, will be obvious from the description, or may be learned by practice of the invention.

BRIEF DESCRIPTION OF THE DRAWINGS

These features, and/or other aspects and advantages of the invention will become apparent and more readily appreciated from the following description of the embodiments taken in conjunction with the accompanying drawings, in which.

DETAILED DESCRIPTION OF THE EMBODIMENTS

Figure 1:
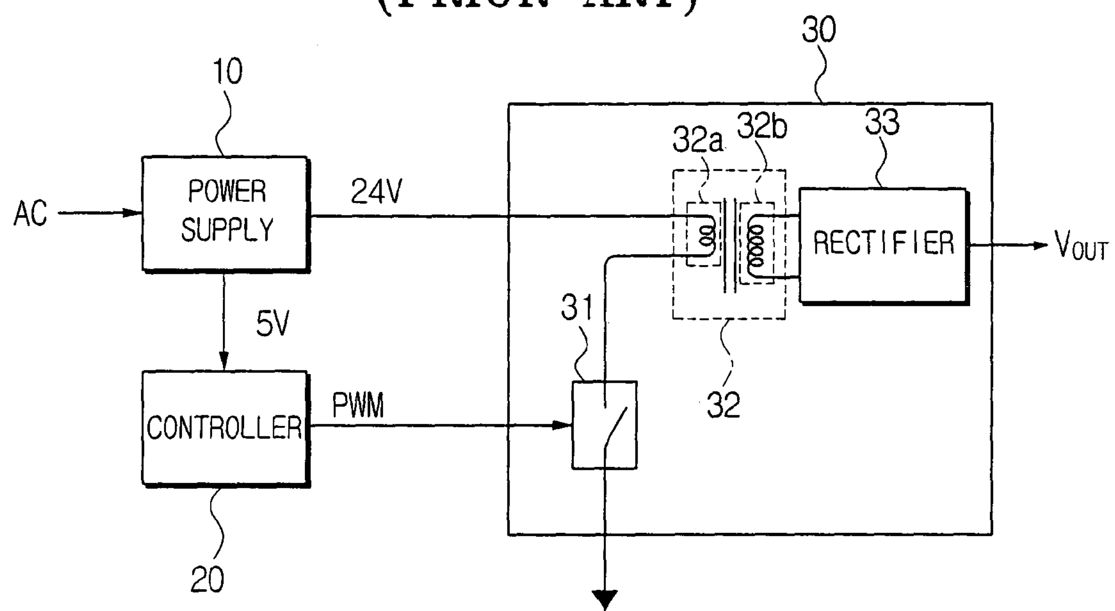
FIG. 1 is a block diagram showing a conventional high voltage supply device.
Figure 2:
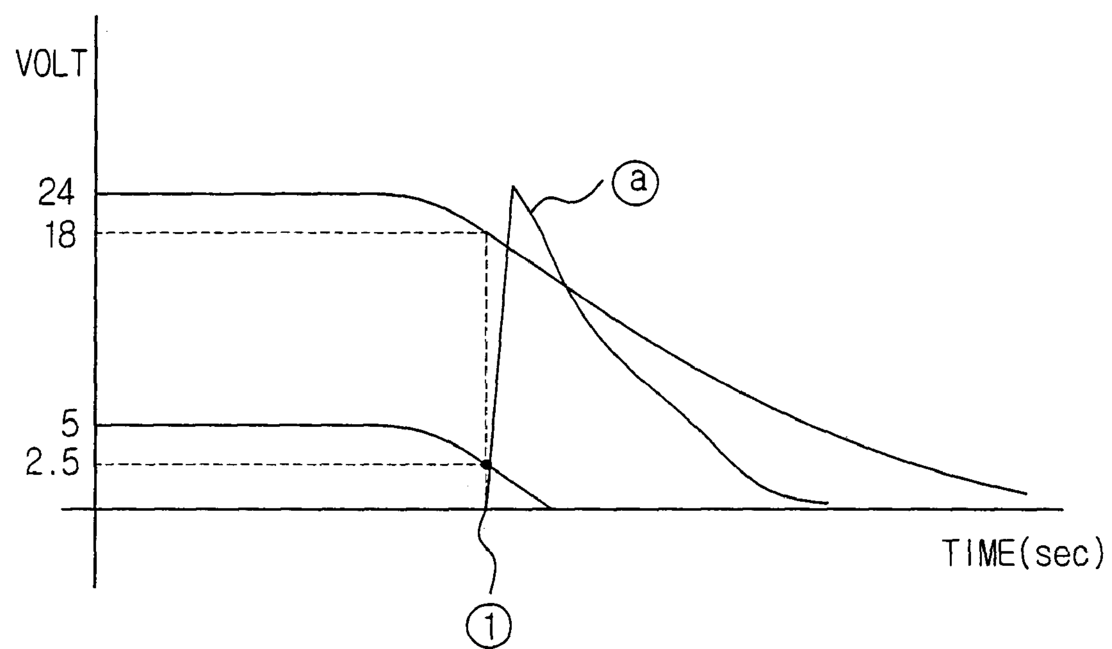
FIG. 2 is a view showing an output voltage waveform of the high voltage supply device of FIG. 1 when the high voltage supply device is turned off.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
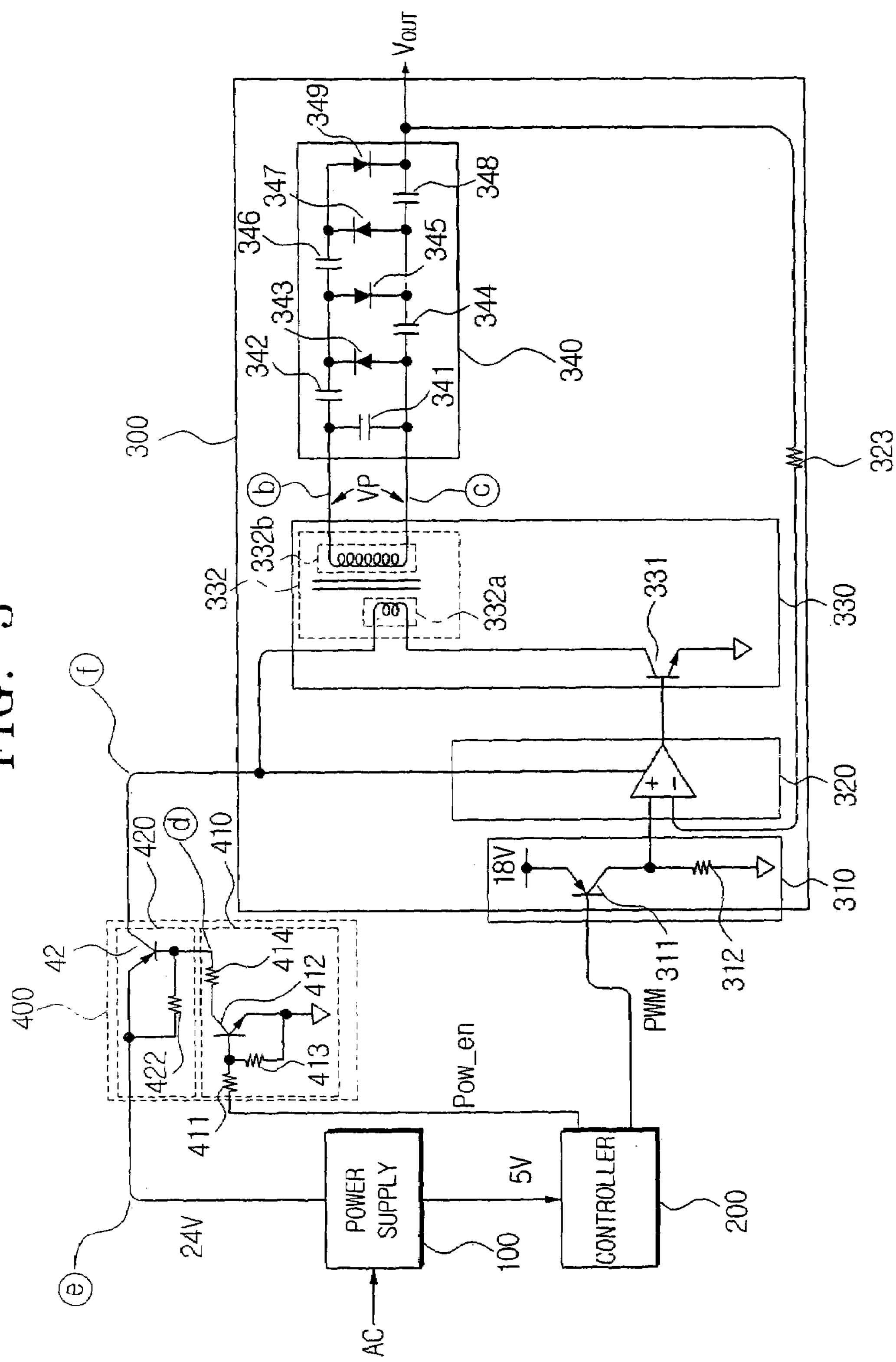
FIG. 3 is a block diagram of a high voltage supply device according to an aspect of the present invention.

FIG. 3 is a block diagram of a high voltage supply device according to an aspect of the present invention.

As shown in FIG. 3, a high voltage supply device may include a power supply 100, a controller 200, a high voltage generator 300, and a power supply controller 400.

The power supply 100 rectifies an externally applied ac voltage and generates dc voltages of e.g., 24V and 5V. High voltages ranging from a few hundred to a few thousand volts to be generated from the high voltage supply device are generated by the dc voltage of 24V The voltage of 5V may be used as an operation voltage for operating the controller 200.

The controller 200 outputs a PWM signal having a predetermined duty ratio according to a preset value, and selectively generates a control signal pow_en having a logic "high" only when the high voltage supply device necessarily outputs a high voltage. In a case of a laser printer, for example, the controller 200 outputs the control signal pow_en having a logic "high" only when electrically charging the organic photo conductor drum with a high voltage. That is, the controller 200 is set to output the control signal pow_en only when a device such as a printer, facsimile machine, or the like with a high voltage supply device requires a high voltage. Such a setting may be obtained by implementing the controller 200 with a microcontroller (not shown). A memory (not shown) in the microcontroller may be programmed to output the control signal pow_en of logic "high" only when a high voltage is required.

The high voltage generator 300 responds to a PWM signal applied from the controller 200 and outputs voltages ranging from a few hundred to a few thousand volts.

The power supply controller 400 responds to the control signal pow_en outputted from the controller 200 when the control signal pow_en is in logic "high," and applies the dc voltage of 24V outputted from the power supply 100 to the high voltage generator 300. Accordingly, when the ac voltage labeled AC applied to the power supply 100 is turned off, the dc voltage of 24V is not applied to the high voltage generator 300 so that the high voltage generator 300 does not generate a surge voltage when the ac voltage AC is turned off.

The high voltage generator 300 has an amplifier 310, a voltage booster 330, and a rectifier 340.

The amplifier 310 amplifies the PWM signal applied from the controller 200 to a predetermined potential level, for example, 18V.

The comparator 320 is provided with an operational amplifier having a positive (+) input terminal and a negative (−) input terminal. The operational amplifier may receive and compare a PWM signal outputted from the amplifier 310 through the positive input terminal and a fed-back part of a voltage outputted from the rectifier 340 through the negative input terminal. Accordingly, in a case where an output voltage of the rectifier 340 is higher than a predetermined level, an output of the operational amplifier 321 becomes the logic "low" and stops the operations of the voltage booster 330.

The voltage booster 330 connects the input terminals 332*a* of a transformer 332 by the switching operations of a transistor 331, which is turned on and off according to a result of the comparison of the comparator 320, to thereby boost the dc voltage of example 24V applied from the power supply controller 400 to ac voltages ranging from a few hundred to a few thousand volts. The dc voltage of 24V across the input terminals of the transformer 332*a* may be frequently turned on and off so that an effective ac voltage is applied to the input terminals 332*a* of the transformer 332. Accordingly, a high voltage may be induced across the output terminals 332*b* of the transformer 332. The length of the wire (for example, enamel wire) used for the output-side winding of the transformer 332 may be longer than that of the input-side winding of the transformer 332, and an ac voltage induced across the output terminals 332*b* of the transformer 332 is determined by the number of winding ratio of the input-side winding and output-side winding of the transformer 332.

The rectifier 340 rectifies and converts a high ac voltage outputted from the voltage booster 330 into a dc voltage. The rectifier 340 uses a N-times multiple voltage rectifier to boost a potential level of an ac voltage outputted from the voltage booster 330. The rectifier shown in FIG. 3 is a four-times multiple voltage rectifier, which outputs a voltage of 4×Vp where a voltage outputted from the transformer 332 is Vp. The operations of the rectifier 30 are described in more detail as follows.

The output voltage Vp of the transformer 332 is rectified in a capacitor 341, and, when a positive voltage is applied to a node labeled "b" of the output terminals 332*b* of the transformer 332, diodes 345 and 349 are forward-biased so that capacitors 342, 344, 346, and 348 are charged to Vp. To the contrary, when a positive voltage is applied to a node labeled "c" of the same, diodes 343 and 347 are forward-biased, but the diodes 345 and 349 are reverse-biased. At this time, a current path is formed between the node labeled "c" and an output terminal Vout so that the capacitors 344 and 348 are electrically charged to an example potential of 2×Vp. Accordingly, a voltage of 4×Vp, which is an addition of the voltages charged into the capacitors 344 and 348, is outputted at the output terminal Vout. While in this example, a four-times multiple voltage rectifier is illustrated for the rectifier 340, the rectifier 340 may have more diodes and capacitors arranged in a similar structure to obtain a higher voltage, for an example, a voltage higher than a five-times multiple voltage.

The power supply controller 400 has a first switching part 410 and a second switching part 420.

The first switching part 410 responds to the control signal pow_en outputted from the controller 200 driven when an output voltage of the power supply 100 becomes 5V, and lowers a node "d" to the ground potential. For example, the NPN-type transistor is used for a transistor 412, a resistor 411 for restraining electric current to be applied to the base of the transistor 412, a resistor 413 for biasing the transistor 412, and a resistor 414 for limiting an output current of the transistor 412.

The second switching part 420 forms a current path between a node "e" and node "f" when the node "d" becomes the ground potential by the first switching part 410. Therefore, when the control signal pow_en from the controller 200 becomes the logic "high", the dc voltage of, for example, 24V outputted from the power supply 100 is outputted from the collector of the transistor 421 and applied to the input terminals 332*a* of the transformer 332 of the voltage booster 330. At substantially the same time, a PWM signal outputted from the controller 200 keeps the transistor 331 of the voltage booster 300 turned off. At this time, the dc voltage of 24V is turned on and off at the input terminals 332*a* of the transformer 332 so that a high ac voltage is induced at the output terminals 332*b* of the transformer 332. When the ac voltage "AC" applied to the power supply 100 is turned off, the control signal pow_en outputted from the controller 200 driven with the dc voltage of 5V becomes the logic "low" so that the power supply controller 400 cuts off the current path between the node "e" and node "f". That is, when the high voltage supply device is turned off, the dc voltage of example 24V is not applied to the input terminals 332*a* of the transformer 332 so that an undesired surge voltage is not induced across the output terminals of the transformer 332.

Figure 4:
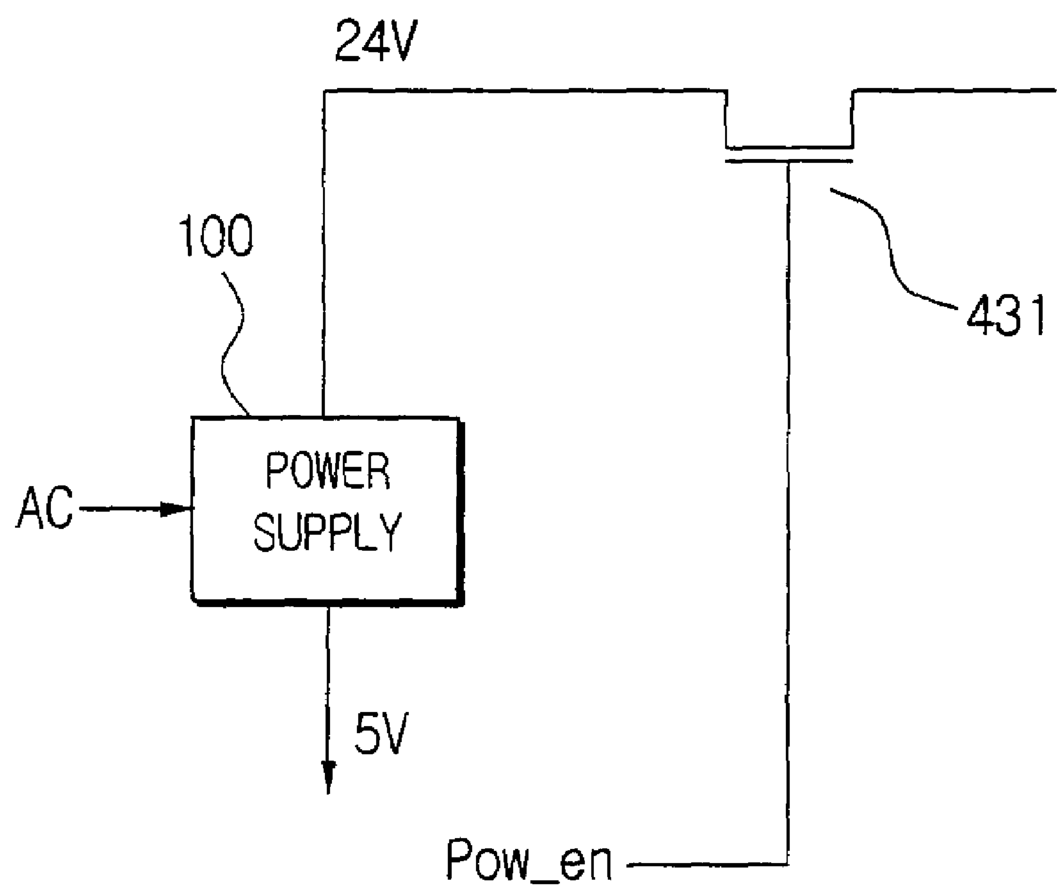
FIG. 4 is a view of a high voltage generator according to another aspect of the present invention.

FIG. 4 illustrates a power supply controller 400 according to another aspect of the present invention.

As shown in FIG. 4, the power supply controller 400 of the high voltage supply device may be implemented with a MOS transistor 431. An NMOS-type transistor is used for the MOS transistor 431, and the gate of the MOS transistor 431 responds to the control signal pow_en outputted from the controller 200 to turn on and off the drain and source of the same. Accordingly, the high voltage generator 300 operates only with the control signal pow_en of logic "high" generated in the turn-on state of the controller 200, so that, when the ac voltage "AC" applied to the power supply 100 is turned off as in FIG. 3, substantially any surge voltage does not occur.

Figure 5:
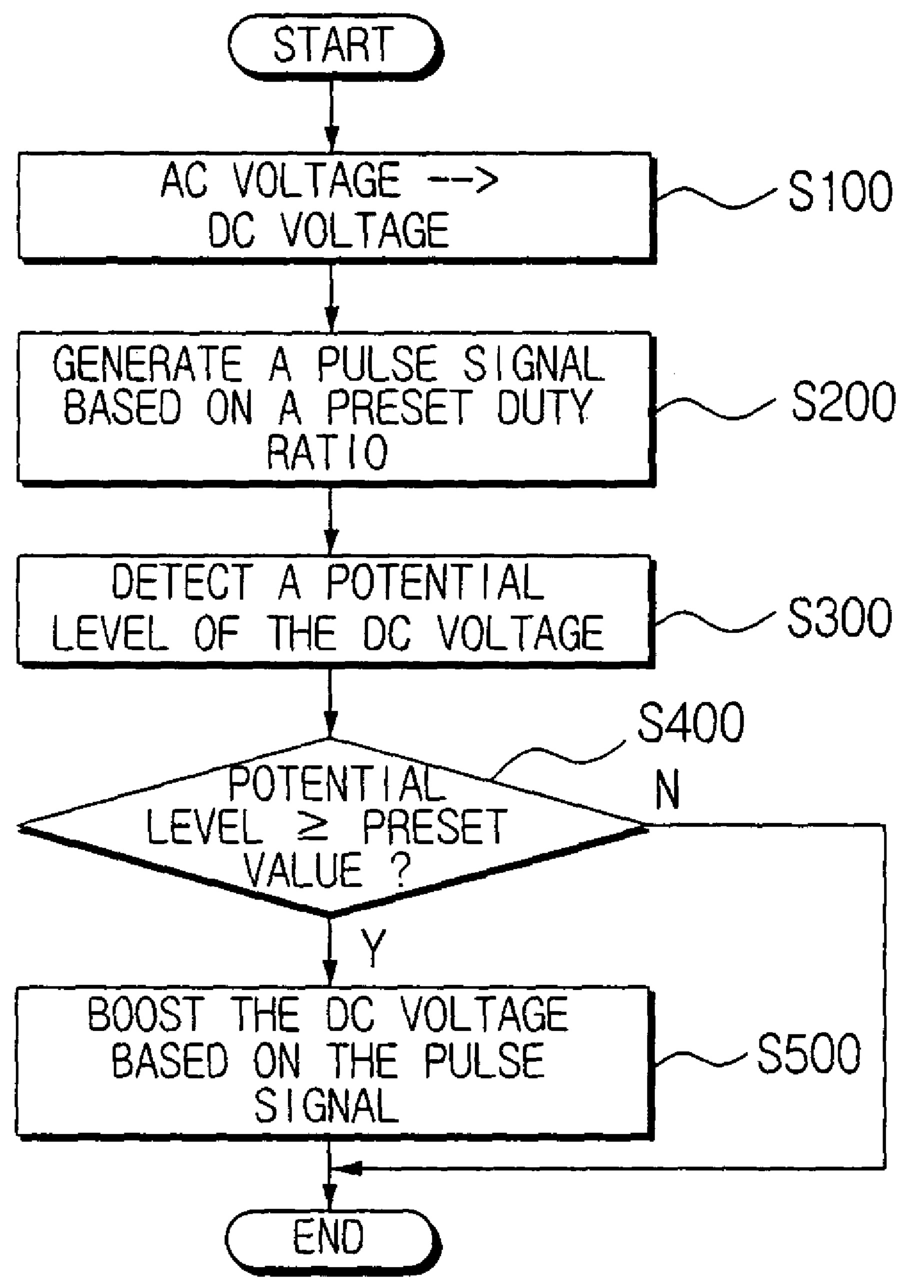
FIG. 5 is a flow chart showing a high voltage control method according to another aspect of the present invention.

FIG. 5 is a flow chart showing a high voltage control method according to another aspect of the present invention.

First, an externally applied ac voltage AC may be rectified e.g., by a power supply 100 to generate predetermined dc voltages of 5V and 25V, for example in operation 100 (O100). In operation 200 (O200), a PWM signal, having a preset duty ratio with an input of the dc voltage of 5V, is generated e.g., by a controller 200 outputting the control signal pow_en of logic "high." Next, a logic level of the control signal pow_en is detected e.g., by a power supply controller 400 (O300). The logic level is compared to a preset level and the power supply controller is turned on when the logic level is "high", and turned off when the logic level is "low" (O400). Further, dc voltage of 24V is inputted by the high voltage generator 300 when the power supply controller 400 is turned on, boosting the inputted voltage to predetermined voltages, for example, ranging from a few hundred to a few thousand volts, and not when the power supply controller 400 is turned off (O500).

A high ac voltage is generated e.g., by a high voltage generator 300 by switching operations turned on and off, based on a PWM signal. Accordingly, a high ac voltage is induced by the high voltage generator 300 with the transformer 332 by the switching operations based on the PWM signal. That is, the high voltage generator 300 operates only with the control signal pow_en generated when an ac voltage AC is externally inputted to the power supply 100 and the dc voltage of 5V is applied to the controller 200, so that the high voltage generator 300 does not operate when the ac voltage is not applied to the power supply 100. Accordingly, when ac voltage from an external source is cutoff, surge voltage is not generated when a dc voltage applied to the transformer 332 of the high voltage generator 300 is discharged.

As described above, the present invention, when used in, for example, a laser printer and a facsimile machine requiring a high voltage supply device or an electronic device requiring a high dc voltage, does not generate a surge voltage hen the power of such an electronic device is turned off. Further, the high voltage supply device is not supplied therein with any dc voltage while in the stand-by mode, to thereby reduce power consumption.

According to another aspect of the invention, the micro-controller in the controller 200 is a computer implementing the method in FIG. 5 using data encoded on a computer readable medium.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A high voltage supply device, comprising:

a power supply rectifying an externally inputted ac voltage and generating a first dc voltage and a second dc voltage;

a controller generating a pulse signal having a predetermined duty ratio and a control signal having a first logic level when the first dc voltage is applied;

a high voltage generator boosting the second dc voltage based on the pulse signal; and a power supply controller driven when the control signal is in the first logic level, and cutting off an application of the second dc voltage to the high voltage generator when the control signal is in a second logic level.

2. The high voltage supply device as claimed in claim 1, wherein the high voltage generator includes:

an amplifier amplifying the pulse signal from the controller, wherein the pulse signal is a pulse width modulation (PWM) signal;

a comparator comparing the PWM signal outputted from the amplifier and a boosted voltage;

a voltage booster boosting the second dc voltage based on switching operations according to an output of the comparator; and a rectifier rectifying an output of the voltage booster.

3. The high voltage supply device as claimed in claim 2, wherein the amplifier includes:

a transistor, the emitter of which is connected to a third dc voltage having a potential level between potential levels of the first dc voltage and the second dc voltage, and the base of which is applied with the pulse signal; and a resistor connected between a collector of the transistor and a ground potential.

4. The high voltage supply device as claimed in claim 2, wherein the comparator inputs an output of the amplifier through a positive input terminal thereof and inputs a fed-back boosted voltage through a negative input terminal thereof.

5. The high voltage supply device as claimed in claim 2, wherein the voltage booster includes:

a transistor, the emitter of which is grounded and the base of which is connected to an output of the comparator; and a transformer, the input terminals of which are connected to a dc voltage applied through the power supply controller and the collector of the transistor respectively.

6. The high voltage supply device as claimed in claim 2, wherein the rectifier is a N-times multiple voltage rectifier boosting a potential level of a voltage outputted from the voltage booster.

7. The high voltage supply device as claimed in claim 1, wherein the power supply controller includes:

a first transistor, an emitter of which inputs the second dc voltage and a collector of which outputs the second dc voltage;

a first resistor connected between the emitter of the first transistor and a base of the first transistor;

a second resistor, one end of which is applied with the control signal;

a second transistor, a base of which is connected to the other end of the second resistor and an emitter of which is grounded;

a third resistor connected to the base and the emitter of the second transistor; and a fourth resistor connected between the collector of the second transistor and base of the first transistor.

8. The high voltage supply device as claimed in claim 1, wherein the power supply controller is an NMOS transistor, a drain and a gate of which are inputted with the dc voltage, and a source of which becomes an output terminal.

9. A high voltage control method, comprising:

rectifying an externally inputted ac voltage;

generating a first dc voltage and a second dc voltage;

generating a pulse signal having a preset duty ratio and a control signal having a first logic level based on the first dc voltage;

boosting the second dc voltage based on the pulse signal; and cutting off the voltage boosting when the control signal is a second logic level.

10. The high voltage control method as claimed in claim 9, wherein the boosting includes:

amplifying the pulse signal;

comparing the amplified pulse signal and the boosted voltage;

boosting the second dc voltage based on a result of the comparison; and rectifying the boosted voltage.

11. A high voltage generator, comprising:

an amplifier amplifying a signal to a predetermined level;

a rectifier;

a comparator comparing the amplified signal output from the amplifier and a fed-back voltage from the rectifier; and a voltage booster boosting an input voltage based on the comparison of the comparator; the rectifier rectifying the boosted voltage output from the voltage booster.

* * * * *